United States Patent
Minemura et al.

(10) Patent No.: US 6,269,062 B1
(45) Date of Patent: Jul. 31, 2001

(54) ARRANGEMENTS FOR USING DETECTED PHASE DIFFERENCES FOR SETTING LASER POWER LEVELS

(75) Inventors: Hiroyuki Minemura, Yokohama; Tsuyoshi Toda, Kodaira, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/038,818

(22) Filed: Mar. 12, 1998

(30) Foreign Application Priority Data

Mar. 14, 1997 (JP) .................................................. 9-060480

(51) Int. Cl.$^7$ ................................................ G11B 7/0045
(52) U.S. Cl. ...................................... 369/47.53; 369/53.34
(58) Field of Search ................................ 369/47–48, 50, 369/54, 58, 59, 116, 53.15, 53.27, 53.36, 59.19, 53.34, 59.17

(56) References Cited

U.S. PATENT DOCUMENTS

| | | | |
|---|---|---|---|
| 4,631,713 | * 12/1986 | Romeas et al. | 369/54 |
| 5,341,360 | * 8/1994 | Johann et al. | 369/116 |
| 5,559,785 | 9/1996 | Honda et al. | 369/54 X |
| 5,642,343 | * 6/1997 | Toda et al. | 369/54 |
| 5,663,942 | 9/1997 | Ishibashi et al. | 369/47 |
| 5,740,149 | * 4/1998 | Iwasaki et al. | 369/116 |
| 5,777,964 | * 7/1998 | Furuta et al. | 369/54 |

FOREIGN PATENT DOCUMENTS

| | | |
|---|---|---|
| 0446892 | 9/1991 | (EP) . |
| 0484555 | 5/1992 | (EP) . |
| 0669611 | 8/1995 | (EP) . |
| 7-302426 | 11/1995 | (JP) . |
| 8-87756 | 4/1996 | (JP) . |

* cited by examiner

Primary Examiner—W. R. Young
(74) Attorney, Agent, or Firm—Antonelli, Terry, Stout & Kraus, LLP

(57) ABSTRACT

For application of asymmetry trial writing onto phase-change recording discs, this invention is intended to determine an optimum level of recording power accurately. Single pattern or random pattern signals are recorded, and phase differences between PLL clock edges and data edges are detected using reproduced signals to determine a threshold value of recording power where a predetermined percentage of phase differences occurs. The threshold power is then multiplied by a constant to provide a optimum level of recording power. Further, there are disclosed arrangements for determining an optimum power condition at a point where an error count (jitter) is minimized, and determining an optimum power condition as an averaged power level existing between low and high power conditions.

24 Claims, 16 Drawing Sheets

FIG. 2a - BACKGROUND ART
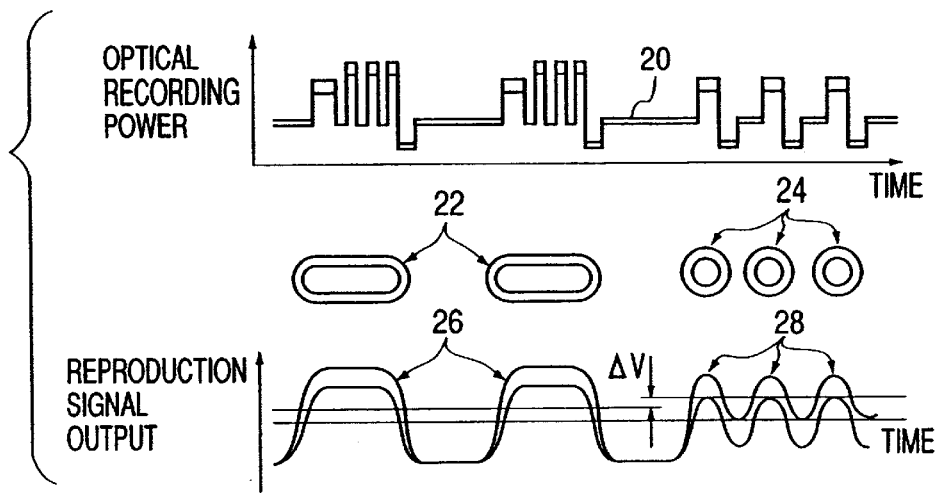
FIG. 2b - BACKGROUND ART
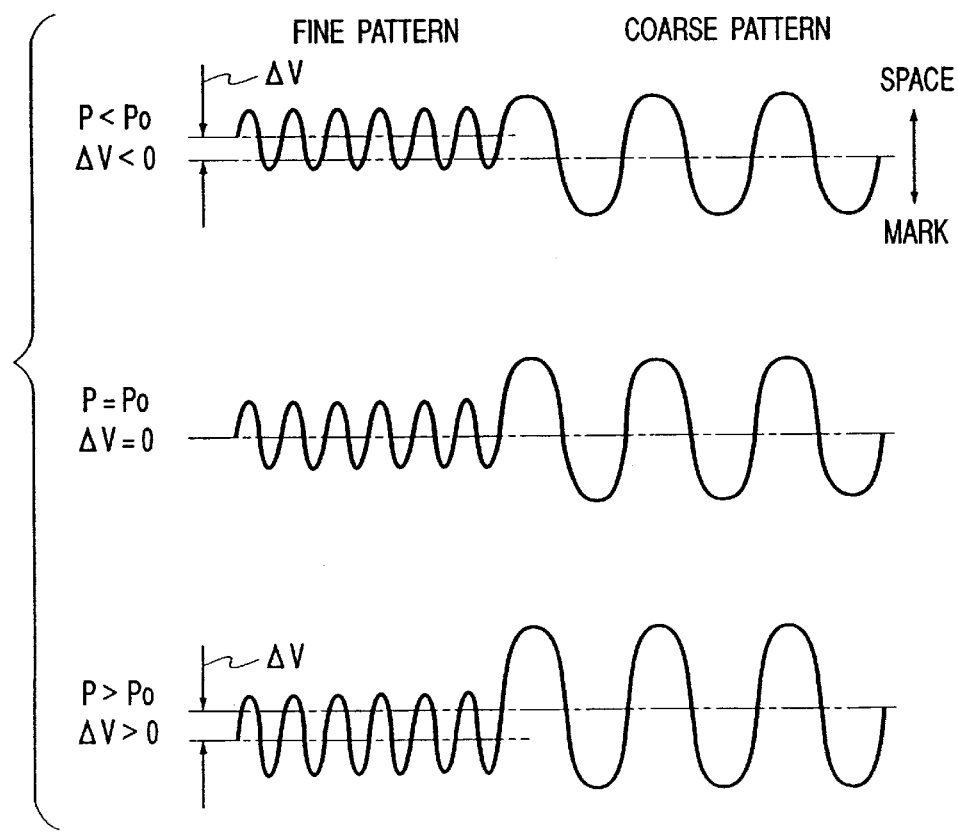

FIG. 3 - BACKGROUND ART
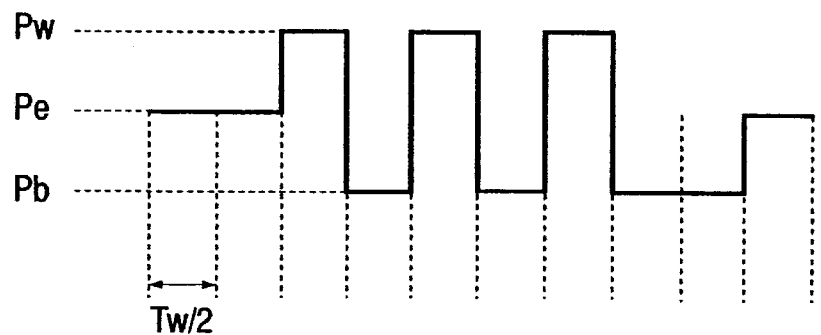
FIG. 4 - BACKGROUND ART
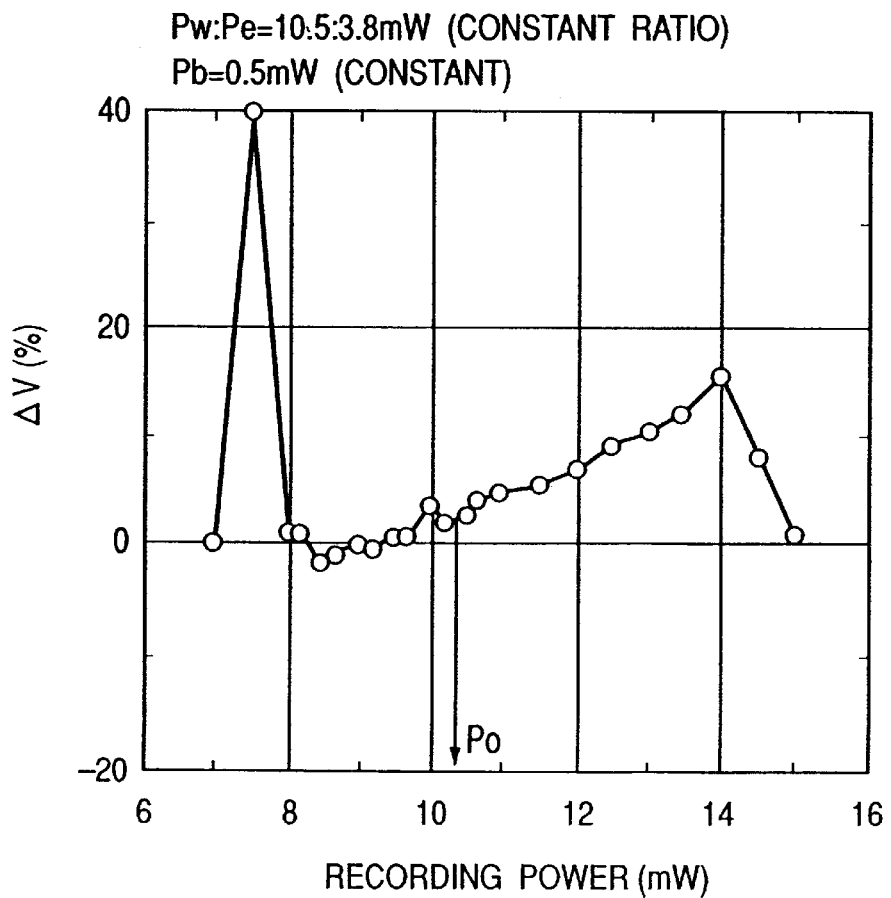

FIG. 5a - BACKGROUND ART
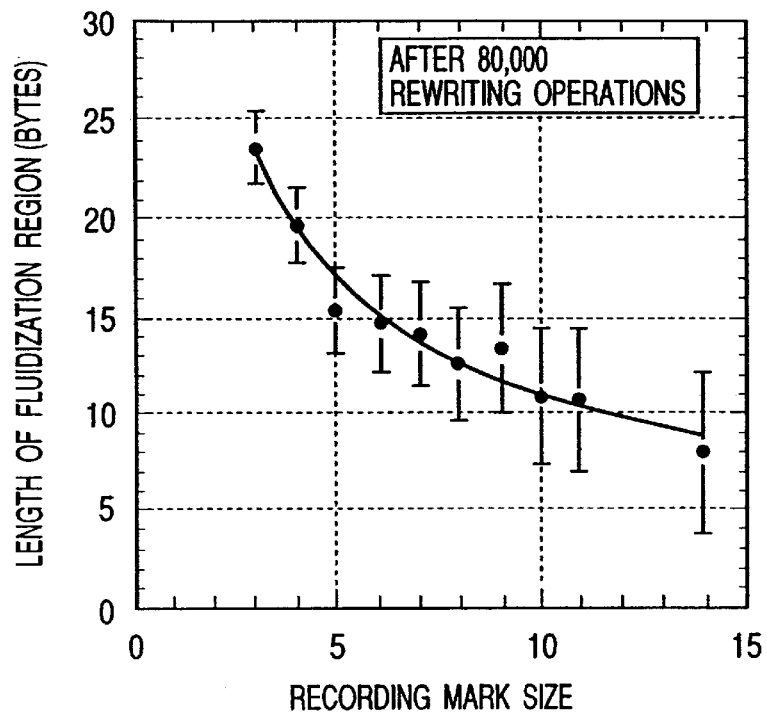
FIG. 5b - BACKGROUND ART
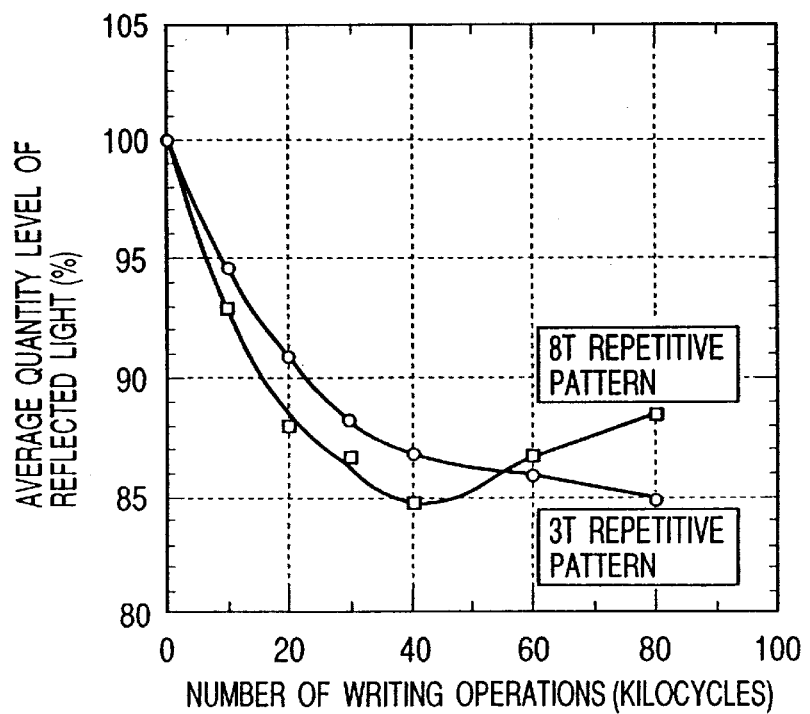

ARRANGEMENTS FOR USING DETECTED PHASE DIFFERENCES FOR SETTING LASER POWER LEVELS

TECHNICAL FIELD OF THE INVENTION

The present invention relates to a signal recording method applied to information recording media, a detector circuit for detecting phase differences between recorded/reproduced signals and a reference signal, and an information apparatus using the phase differences to determine a condition for subsequent recording of data on the media, and more particularly to a phase difference technique for determining a laser power level allowing high-density information recording.

DISCUSSION OF BACKGROUND ART

A recording-type optical disc is capable of holding a large amount of information and has a feature that it is a replaceable (i.e., swapable) medium. In reproduction of information recorded on the optical disc, a beam of laser light is focused onto an information recording side thereof, and light modulated by a record mark is reflected for detection. In recording of information on the optical disc, a laser beam having a power which is larger than a laser beam power used in reproduction is applied to the information recording side to form a record mark thermally.

Recording-type optical disc media are roughly classified into the following three types: (1) magneto-optical type, (2) phase-change type, and (3) pit-forming type. For rewritable recording, magneto-optical type discs are in widespread use, and for write-once recording, organic-pigment pit-forming type optical discs represented by recordable compact discs (CD-R) are popular.

To increase a storage density of the recording-type optical disc, precise control of recording power is required since smaller record marks must be formed with higher and higher precision, in higher and higher density. In an actual optical disc apparatus, however, even if an output level of a light source is kept constant, it is difficult to provide a required temperature distribution on the information recording side of the optical disc due to adverse effects, e.g., dynamic variations in ambient temperature, laser wavelength, beam spot distortion, etc.

Therefore, as disclosed in Japanese Non-examined Patent Publication 195713/1994, a technique called "trial writing" is employed in recording information on the recordable compact disc (CD-R). With this technique, trial writing is performed ti before user data is recorded, with the trial writing being conducted on a predetermined test area to determine an optimum level of recording power.

Furthering such discussion, in the FIG. 2a illustrated trial writing method, fine and coarse patterns are recorded alternately as shown. More specifically, a laser beam uses recording waveform 20 to create coarse 22 and fine 24 pits in a recording media, and upon reproduction, reproduced signals 26 and 28 are obtained from the coarse 22 and fine 24 pits, respectively. Using reproduced signals, a difference in an average level between fine and coarse patterns, i.e., an asymmetry value $\Delta V$ (FIG. 2a) is detected, and a recording power level Po where the asymmetry value becomes approximately zero (middle example; FIG. 2b) is determined as an optimum recording condition. If the recording power level P is lower than Po (top example; FIG. 2b), $\Delta V$ takes a negative value since the record mark is smaller than a specified shape. On the contrary, if the recording power level P is higher than Po (bottom example; FIG. 2b), $\Delta V$ takes a positive value since the record mark is larger than the specified shape. Therefore, an optimum recording power level Po can be determined through detection of asymmetry $\Delta V$ by changing the recording power in a proper range, and determining a power Po where asymmetry $\Delta V=o$. In this method, it is possible to attain a linear response as long as the width of a record mark is constant, even if the length thereof varies.

Description will now give further background and then tend toward discussion of problems occurring in application of the above-discussed "asymmetry detection" trial writing method while recording on phase-change optical discs. Since the information recorded on the phase-change optical disc is reproduced using a difference in reflectance between crystal and amorphous states of the media, the same type of reproducing circuit as for a CD-ROM may be used, i.e., the phase-change type of optical disc has an advantage of possible compatibility with the ROM type of optical disc.

As background on the phase-change optical disc, a record mark is formed as an amorphous state by melting a spot on a recording layer thereof with a laser beam and then quenching the spot. To erase the record mark, the amorphous state thereof is crystallized by irradiating the spot with laser heat having a temperature that is higher than a level of crystallization and lower than a melting point. If the quenching timing is delayed after melting in information recording, the spot is recrystallized. This phenomenon is called "recrystallization". Therefore, the shape of record mark is determined depending on spot cooling conditions as well as achieved temperature distribution. These are particularities of the phase-change optical disc recording mechanism, which are different from other mechanisms for recording such types of optical discs as magneto-optical discs.

In an example of examination of a phase-change optical disc, characteristics of an exemplary "asymmetry detection" trial writing method were measured using a GeSbTe phase-change material as a recording layer. A sample disc consisted of a plastic substrate having a diameter of 120 mm and a thickness of 0.6 mm, which had a lamination of a ZnS—SiO2 primary optical interference layer, GeSbTe recording layer, ZnS—SiO2 secondary optical interference layer, Al—Ti reflective layer, and UV protective layer. On the substrate, there were formed track grooves with a pitch of approx. 0.7 $\mu$m for land group recording. A recording waveform having three recording levels Pw, Pe and Pb as shown in FIG. 3 was used, and a channel clock signal Tw was employed (where T is a predetermined channel bit length). For forming a record mark nTw, 'n−1' Tw/2-width pulses were applied. For data modulation, an "8–16" modulation method was employed in which 1 Tw was approx. 0.2 $\mu$m. The shortest mark length was 3 Tw, and the longest mark length was 14 Tw. A laser beam having a wavelength of 680 nm was emitted from a semiconductor laser source, and a beam spot for recording was formed by means of focusing through an objective lens having a numerical aperture value of 0.6. In measurement, a linear velocity of 6 m/s was used. A center value of a power margin Po in overwriting random signals on the sample disc was 10.5 mW in a case of Pw, and 3.8 mW in a case of Pe. A recording power level for trial writing was changed while maintaining a Pw-to-Pe ratio at 10.5 mW to 3.8 mW. A level of Pb was kept constant at 0.5 mW. Repetitive 3 Tw mark-space recording was made for fine patterning, and repetitive 8 Tw mark-space patterning was made for coarse patterning.

FIG. 4 shows a relationship between recording power and asymmetry $\Delta V$ plotted in the measurement mentioned above, and a problem caused by recrystallization. On the axis of ordinate in this figure, the amount of asymmetry ΔV was normalized with coarse pattern signal amplification. In a recording power range of 9 to 14 mW, the asymmetry ΔV had a gradually increasing characteristic, with variation of up to 15% on the positive side and variation of just approx. 3% on the negative side. There was a tendency that the slope of asymmetry ΔV was relatively gentle in a recording power range lower than Po. In the vicinity of the start point of recording, there occurred a phenomenon of code reversal.

These characteristics in the lower recording power range resulted from a problem owed to the above mentioned recrystallization in recording. More particularly, in comparison between coarse and fine patternings, a laser irradiation time in fine patterning is shorter than that in coarse patterning. Therefore, in fine patterning, the degree of thermal retention is smaller and heating and cooling are performed more rapidly, leading to a smaller extent of recrystallization. Since a difference in recrystallization between the coarse and fine patternings is larger in the vicinity of a recording threshold, the width of record mark in the fine patterning becomes thicker than that in the coarse patterning. The amount of asymmetry varies differently on the positive and negative sides and it cannot be determined definitely with respect a certain level of recording power, which means that complex processing procedures are required for determination of an optical power level Po using the "asymmetry detection" trial writing method.

Next, the following describes characteristics and problems related with a rewriting service life of the phase-change optical disc. As rewriting on the phase-change optical disc is repeated, the disc deteriorates gradually. Two of the most appreciable deterioration phenomena are; (1) fluidization of recording layer, and (2) change in reflectance. It is thought that the fluidization of a recording layer occurs due to thermal stress applied in the melted state of the recording layer at the time of recording. A change in reflectance, which is related with the phenomenon of recording layer fluidization, is thought to occur due to such causes induced by thermal stress as segregation in recording layer composition, penetration of interference layer materials, etc.

FIGS. 5a and 5b show examples of deterioration characteristics of phase-change optical discs used in an experimental examination. Referring to FIG. 5a, there is shown a graph indicating a relationship between length of record marks and degree of fluidization. In the examination, overwriting was performed 80,000 times continuously using a recording power Po. Each pattern in FIG. 5a indicates a repetitive pattern containing mark and space codes equally. At intervals of 50 bytes, each block consisting of 200 bytes was recorded.

As to fluidization, a length of a region where the initial signal amplitude decreased to less than ½ was measured at the beginning and end of each block. In FIG. 5a, a length of each fluidization region is indicated with respect to the beginning block. As can be seen from this figure, the length of a fluidization region was longer as the length of mark was shorter. For example, in a case of a 3 Tw mark, the fluidization region length thereof was more than double that of a 11 Tw mark.

Referring to FIG. 5b, there is shown a normalization plot indicating average quantities of reflected light from 3 Tw and 8 Tw patterns over repetitive writings, with respect to a 100% initial value level. As the number of rewriting operations increases, the average quantity level of reflected light decreases. In comparison between 3 Tw and 8 Tw patterns, the slope of the curve indicating a decrease in quantity of reflected light from 3 Tw patterns does not match that of 8 Tw patterns. This signifies that a rate of deterioration of the recording layer, as well as fluidization, depends on the length of mark. Since a difference in average quantity level of reflected light represents the amount of asymmetry, the plot in FIG. 5b reveals that the amount of asymmetry varies with the number of rewriting operations, even if the same level of power is applied. That is, if the number of rewriting operations is different between the test area for trial writing and areas for actually recording user data, it is impossible to set up a proper recording level of laser power.

As described above, it was found that the above-described trial writing method based on "asymmetry detection" is not suitable (i.e., is disadvantageous) for determination of an optimum recording power level on the phase-change optical disc because of the following reasons: (1) recrystallization and the differences in heating/cooling times between coarse and fine marks (pits), (2) fluidization, (3) improper linearity and indefinite determination characteristic in target point detection, and (4) dependency of recording layer deterioration on length of record mark.

SUMMARY OF THE INVENTION

It is therefore an object of the present invention to provide a trial writing method suitable for determining an optimum recording power level on a phase-change optical disc to obviate the above mentioned disadvantages attendant with the "asymmetry detection" trial writing method. It is another object of the present invention to provide an optical disc apparatus using said method.

For application of trial writing onto phase-change recording discs, this invention is intended to determine an optimum level of recording power accurately. To accomplish the same, the method and apparatus of the present invention uses analysis of phase differences of trial writing marks to determine an optimum laser writing power level in a number of different ways. Single pattern or random pattern signals are recorded, and phase differences between PLL clock edges and data edges are detected using reproduced signals to determine a threshold recording power where a predetermined percentage of phase differences occurs. More particularly, since a 15% phase difference plot range and an associated recording threshold power can be determined definitely through gradual scanning of power from a low level thereof, and an adjustment value corresponding to a difference between a typical threshold recording power and a typical optimum recording power can be experimentally determined, or can be provided by a disc manufacturer, it is possible to realize a trial writing operation suitable for determining a recording power level for a loaded phase-change optical disc. More specifically, once determined, the threshold power is multiplied by a constant to provide a optimum level of recording power. Further, there are disclosed arrangements for determining an optimum power condition at a point where an error count (jitter) is minimized, and determining an optimum power condition as an averaged power level existing between low and high power conditions.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only, and is not to be taken by way of limitation, the spirit and scope of the present invention being limited only by the terms of the appended claims.

BRIEF DESCRIPTION OF THE DRAWINGS

FIGS. 2a and 2b show schematic diagrams of a disadvantageous trial writing method in which an amount of asymmetry is detected;

FIG. 3 is a diagram showing a recording waveform;

FIG. 4 is a graph showing characteristics of the disadvantageous asymmetry method in application to phase-change discs;

FIGS. 5a and 5b respectively show relationships between fluidization due to rewriting on phase-change optical discs, and variation in reflectance;

DETAILED DESCRIPTION OF THE PREFERRED EMBODIMENTS

In carrying out the invention and according to one aspect thereof, there are provided arrangements for solving/avoiding the above-discussed problems, such arrangements being discussed below as follows.

(1) In recording of coarse and fine patterns, different recording layer deteriorations occur, depending on the length of record mark. To prevent/avoid such phenomenon from affecting laser writing power determination with the trial writing approach of the present invention, single-mark repetitive signals (e.g., 11T size signals/marks) are used for pattern recording. More specifically, the 11T size signal/mark was chosen from analysis of the FIG. 5a experimental plot, and the realization that an 11T size signal/mark gives good performance with respect to the fluidization phenomenon.

(2) A phase difference between edges of data signal and a clock signal (obtained from phase-locked-loop treatment of the reproduced signal) is detected while changing a recording power level for measurement of equivalent jitter. Through this measurement, a recording threshold corresponding to a point where jitter becomes lower than a predetermined threshold level (e.g., 15%) is determined, and a determined value of recording threshold is multiplied by a predetermined constant (e.g., 1.25) to determine an optimum recording condition.

Figure 6:
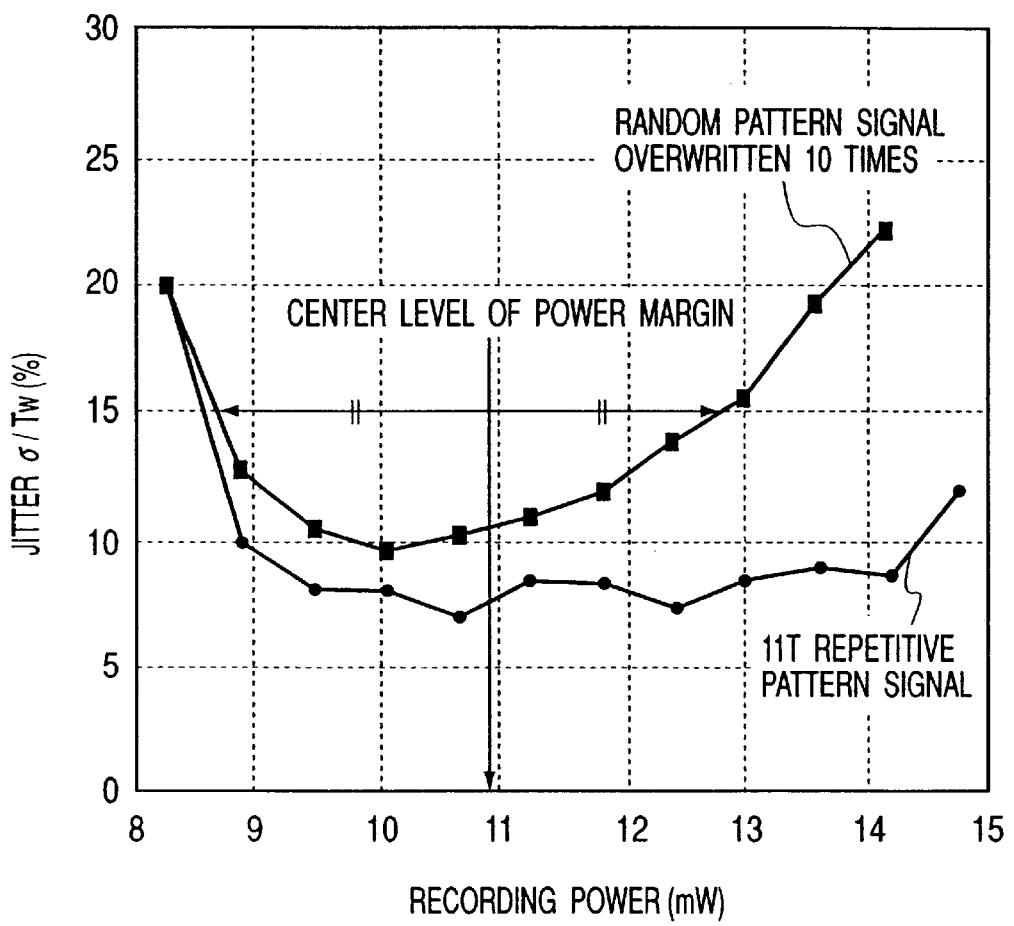
FIG. 6 is a graph showing a relationship between recording power and jittering of data and clock edges.

Referring to FIG. 6, there is shown a graph indicating a relationship between recording power and jittering of data and clock edges. More specifically, this graph was plotted by measuring jitter levels of 11Tw mark-space repetitive signals in a first-time recording (lower plot; FIG. 6), and jitter levels of random signals after a tenth overwriting thereof (upper plot; FIG. 6). Generally, in correction using ECC code on an optical disc, there is an allowable limit that a bit error rate in reproduced data is $1/1000$ to $1/10000$. Therefore, a jitter level of approx. 15% is an upper limit for preventing an error, and this 15% is used as a predetermined limit in analysis of the present invention (although any other predetermined limit, e.g., 10%, 20%, can be used to meet any standard, or result in any degree of power level determination accuracy). As shown in FIG. 6, a center level (e.g., 10.8 mW) of a recording power margin range where jitter of the random signal after overwriting is less than 15% corresponds to a target recording value in trial writing. More particularly, once trial writing at incremental power levels is performed, and the FIG. 6 plot and plot range having jitter of less than 15% are found, a recording power can be selected as any power within the 15% plot range. Preferably, an appropriate centrally located power (e.g., a power at the center of the 15% plot range) is selected or alternatively, a power resulting in the lowest jitter level (e.g., 10 mW; FIG. 6) is selected. However, a more preferred power selection process is described ahead.

Figure 7A:
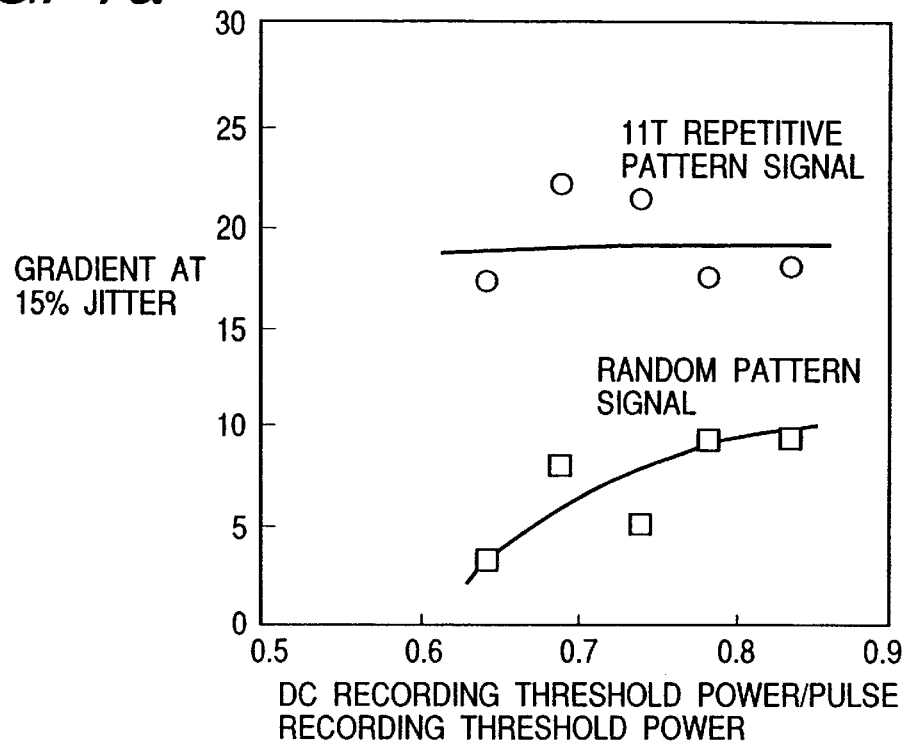
FIGS. 7a and 7b respectively show relationships between sensitivity of trial writing, and a ratio 'α' on sample discs.
Figure 7B:
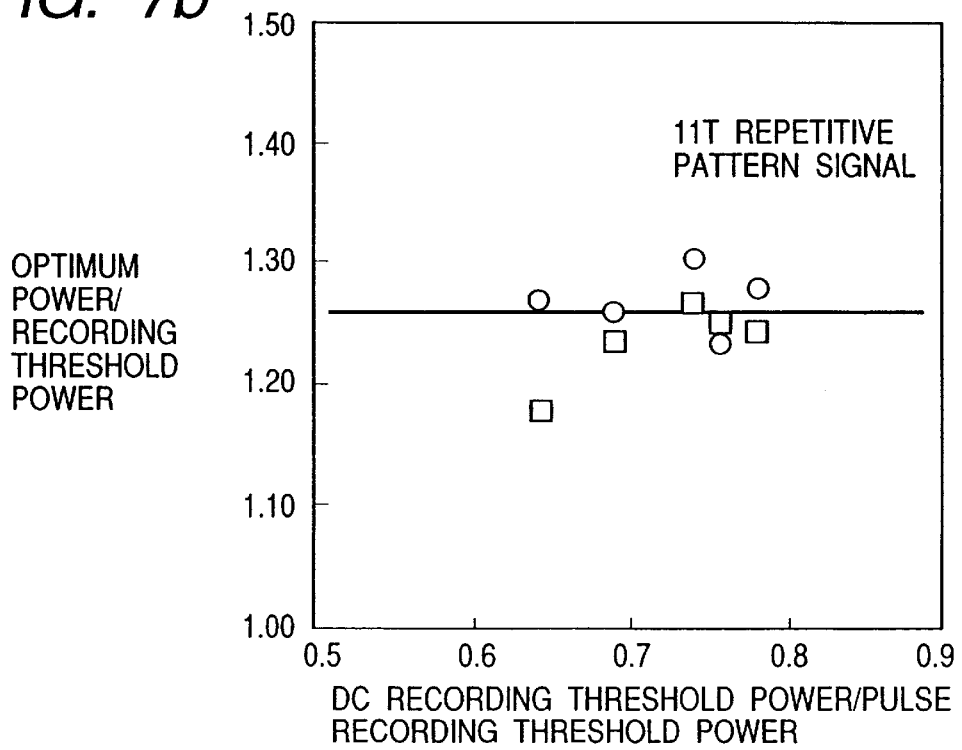

For the purpose of ensuring applicability of trial writing of this invention to various kinds of optical discs, measurement was made using five sample discs (represented as five different points in FIGS. 7a, 7b plots) which were different in recording layer composition and structure. The results of measurement are shown for examination of the trial writing. In FIGS. 7a and 7b, the abscissa indicates a ratio 'η' of threshold power in DC beam recording at start to threshold power in pulse recording. If this value is large, the recording layer melted by exposure to DC beam is likely to become crystalline again through recrystallization, i.e., the abscissa in FIG. 7a represents the degree of recrystallization tendency on each sample disc. The ordinate in FIG. 7a corresponds to a slope 'm' of the curve in FIG. 6 at a jitter level of 15%. As shown in FIG. 7a, while the value 'm' varies with the value 'η' in random signal recording, the value 'm' is relatively large and constant in 11Tw repetitive signal recording.

In determination of a recording threshold power Pth, the detection accuracy becomes higher as the value 'm' increases, and it is desirable to reduce variation among different kinds of media. The 11Tw repetitive pattern signal recording is therefore more suitable than the random pattern signal recording, and is selected as a preferred trial waiting pattern in the trial writing method/apparatus of the present invention. A difference between the FIG. 7a 11T and random pattern recordings is that jitter in the 11T single-pattern repetitive signals is mainly caused by fluctuation in data edge, whereas jitter in the random signals contains shift components dependent on mark length in addition to fluctuation components in data edge (thus making random pattern recording less preferred with respect to the present invention).

Referring to FIG. 7b, there is shown a graph indicating relationship between value 'η' and ratio 'α' of an optimum power to a recording threshold power. More particularly, as illustrated in FIG. 7b, the recording threshold power Pth occurs at a point (after the initial code-reversal peak) where a 15% jitter level is encountered, whereas the optimum power Po is, for example, a power level at a center of the 15% jitter plot range. As shown by experimentations and the resultant plot in FIG. 7b, the ratio 'α' between the threshold power and optimum power measured on five sample discs having different characteristics was a constant value of approx. 1.25. Based on the results of the FIG. 7b examination, it was found that, as a preferred method, an optimum power level can be determined in single-pattern recording by attaining a value of recording threshold power Pth, (as described above with respect to FIG. 1b) and multiplying it by a factor of ratio 'α' (i.e., the aforementioned 1.25 value).

To summarize discussions, since a 15% plot range and an associated recording threshold power can be determined definitely through gradual scanning of power from a low level thereof and the multiplication ratio 'α' can be adopted as the aforementioned 1.25 value, can be otherwise experimentally determined, or can be provided by a disc manufacturer, it is possible to realize a trial writing operation suitable for determining a recording power level for a loaded phase-change optical disc. Having described the present invention as related to phase-change optical discs, it is believed that the invention is also applicable to magneto-optical discs and pit-forming-type write-once optical discs. The present method/apparatus invention may likewise be applicable to other types of disks.

Discussion now turns to several examples.

EXAMPLE 1

Trial Writing Method

Figure 1A:
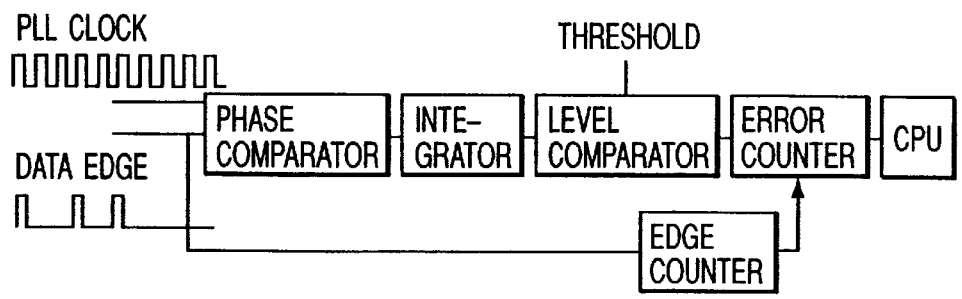
FIGS. 1a and 1b respectively show a scheme of a phase difference detection method and apparatus in a preferred embodiment of this invention and results of experiment on trial writing in the scheme thereof.
Figure 1B:
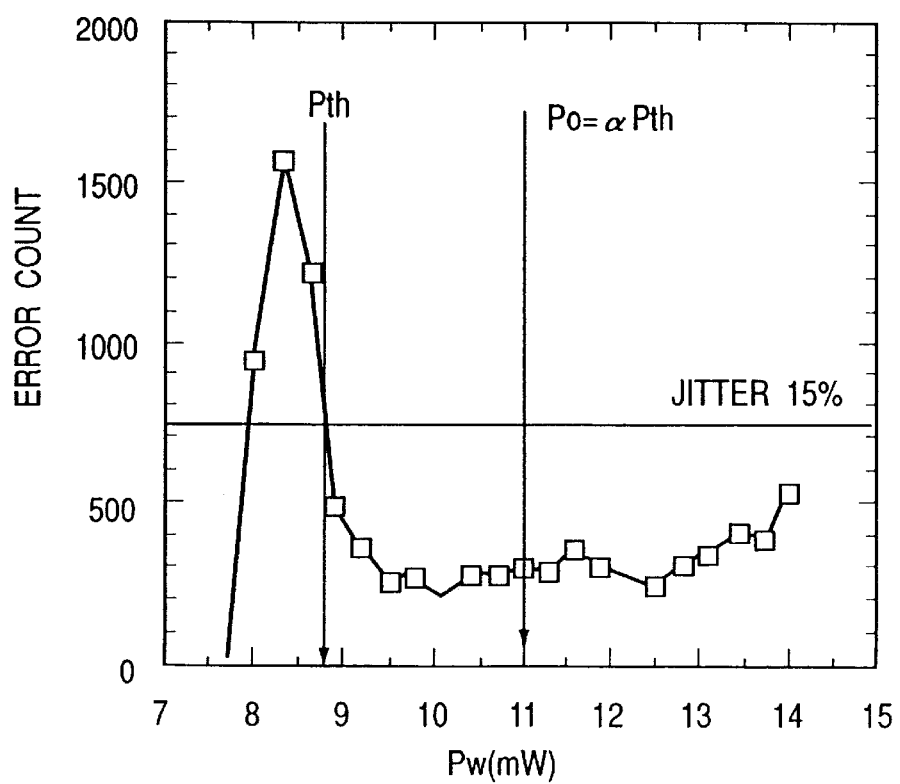

FIGS. 1a and 1b show a scheme of a phase difference detection apparatus and method in a preferred embodiment of this invention, and results of an experiment on trial writing in the scheme thereof, i.e., show a "phase difference" trial writing method and apparatus. More particularly, referring to FIG. 1a, edge pulses of data signals and clock signals (extracted from a reproduced signal though a phase locked loop circuit; not shown) are input to a phase comparator which produces a pulse signal having a length corresponding to a phase difference between edges of the clock and data signals. The pulse signal thus produced is fed to an integrator for conversion from a pulse width to a phase error voltage. Then, using a level comparator, the phase error voltage is compared with a predetermined threshold level. When the phase error voltage is higher than the threshold level, a data edge pulse is transferred as an error pulse to an error counter for cumulative counting thereof. Simultaneously, the edge counter counts all the data edge pulses. When a specified value is reached in this counting operation, the error counter is stopped. An error count value attained in the error counter is then input to a CPU for processing execution.

In the scheme mentioned here, a value of jitter can be input to the CPU as a ratio representing a phase difference that is larger than the threshold value in comparison with the clock, with respect to the total number of edges counted by the edge counter. This method is advantageous in that variations in the phase error voltage due to non-uniform recording sensitivity in reproduced sectors, fluctuation in servo control error, etc., can be integrated as a number of pulses for smoothing to provide higher stability in measurement. Also, in this method, the scale of a necessary circuit can advantageously be made smaller than in such an arrangement where the phase error voltage is directly input by means of an AD converter or other device. By quantifying a phase difference between the clock and data edges as described above, a physical quantity equivalent to a jitter value attained using such a measuring instrument as a jitter analyzer can be measured in an optical disc apparatus.

Referring now to FIG. 1b, there is shown a graph indicating results of a experiment wherein trial writing was performed using the phase difference detection method of this invention. In the experiment, sample discs used in the experimental measurement shown in FIG. 6 were employed again as recording media. A gain in the integrator was determined so as to attain a phase error voltage of 1.8 V on occurrence of deviation of ±50% in window width Tw. This value is equivalent to a phase difference sensitivity of 0.01 V/deg. A threshold value in the level comparator was 0.8 V (±22% of window width), and a preset value in the edge counter was 2560. For record patterning, a pit size of an 11Tw repetitive signal recording was performed under a constant power condition where Pw:Pe=11 mW:4.5 mW. As shown in FIG. 1b, a variation in the error count with respect to recording power was the same as the jitter characteristic indicated in FIG. 6. At a threshold equivalent to a 15% jitter level, an error count of 700 was indicated. Under this condition, a value of threshold power Pth was 8.8 mW, and a recording condition value Po of 11 mW was attained through multiplication by a factor 'α' of 1.25. In comparison with an actually measured value of 10.8 mW in FIG. 6, an error in the above method was 2% or less. According, with such acceptable error, it can be seen that the preferred method of using a determined threshold power multiplied by a α factor to determine an optimum power Po, is a reliable and advantageous (e.g., is an easily implementable) method.

Figure 8:
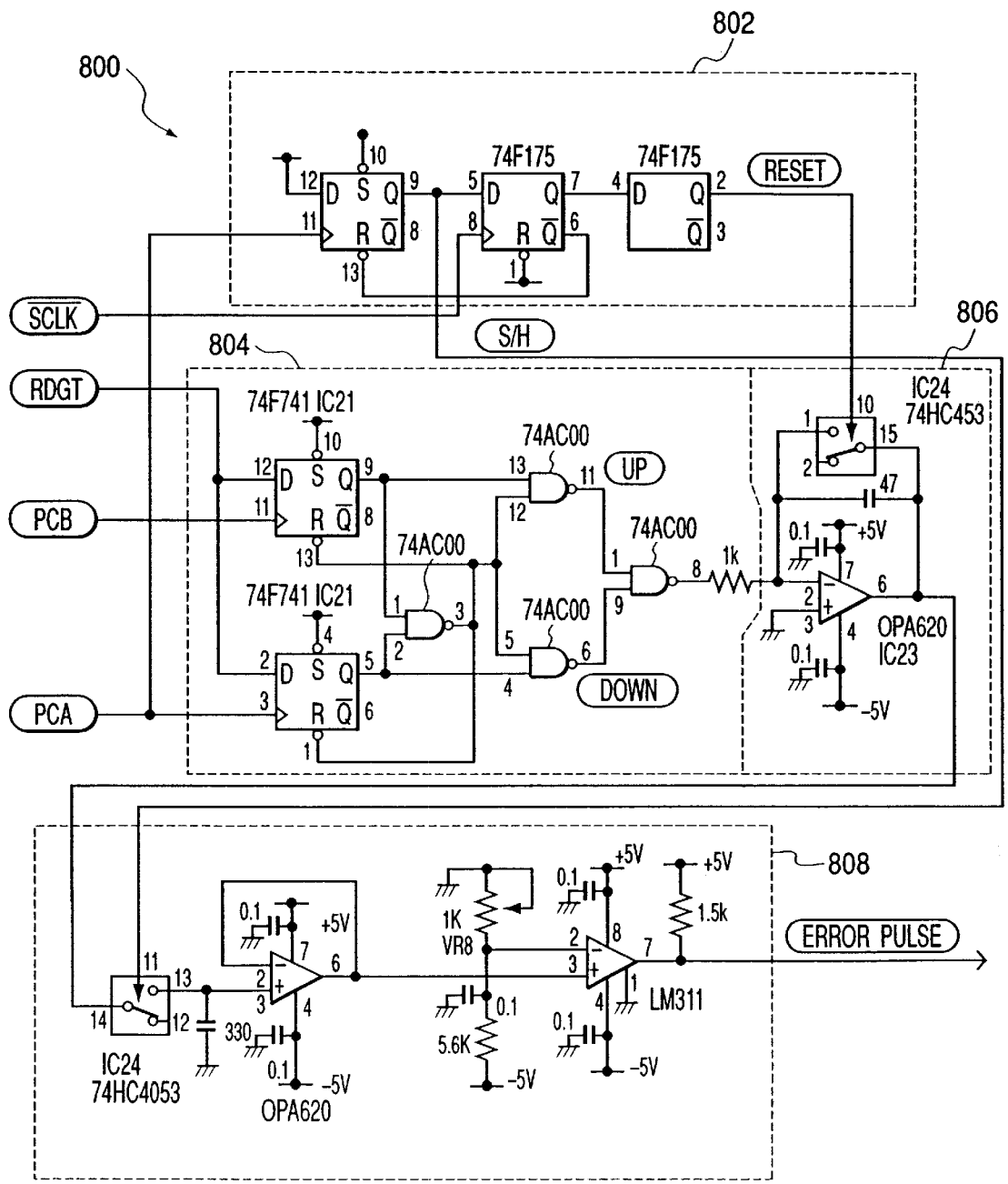
FIG. 8 is a block diagram showing a phase difference detector circuit in an embodiment of this invention.

Referring to FIG. 8, there is shown a circuit configuration of the phase difference detector 800 that was used in actual measurement. In this figure, there are illustrated control logic 802, phase comparator 804 (exclusive or logic) integrator 806, and error pulse generator 808. Further, SCLK indicates a PLL clock signal, RDGT indicates a reproducing gate corresponding to a data area on a sector, PCA indicates a data edge pulse signal, PCB indicates a pulse signal extracted from the PLL clock signal for comparison with a data edge, ERROR PULSE indicates an error pulse signal, RESET indicates a reset signal for the integrator, S/H indicates a control signal for sampling and holding of phase error voltage, UP indicates a pulse signal that has a length corresponding to a phase lead of a data edge in comparison with the PLL clock, and DOWN indicates a pulse signal that has a length corresponding to a phase lag of a data edge in comparison with the PLL clock.

Figure 9:
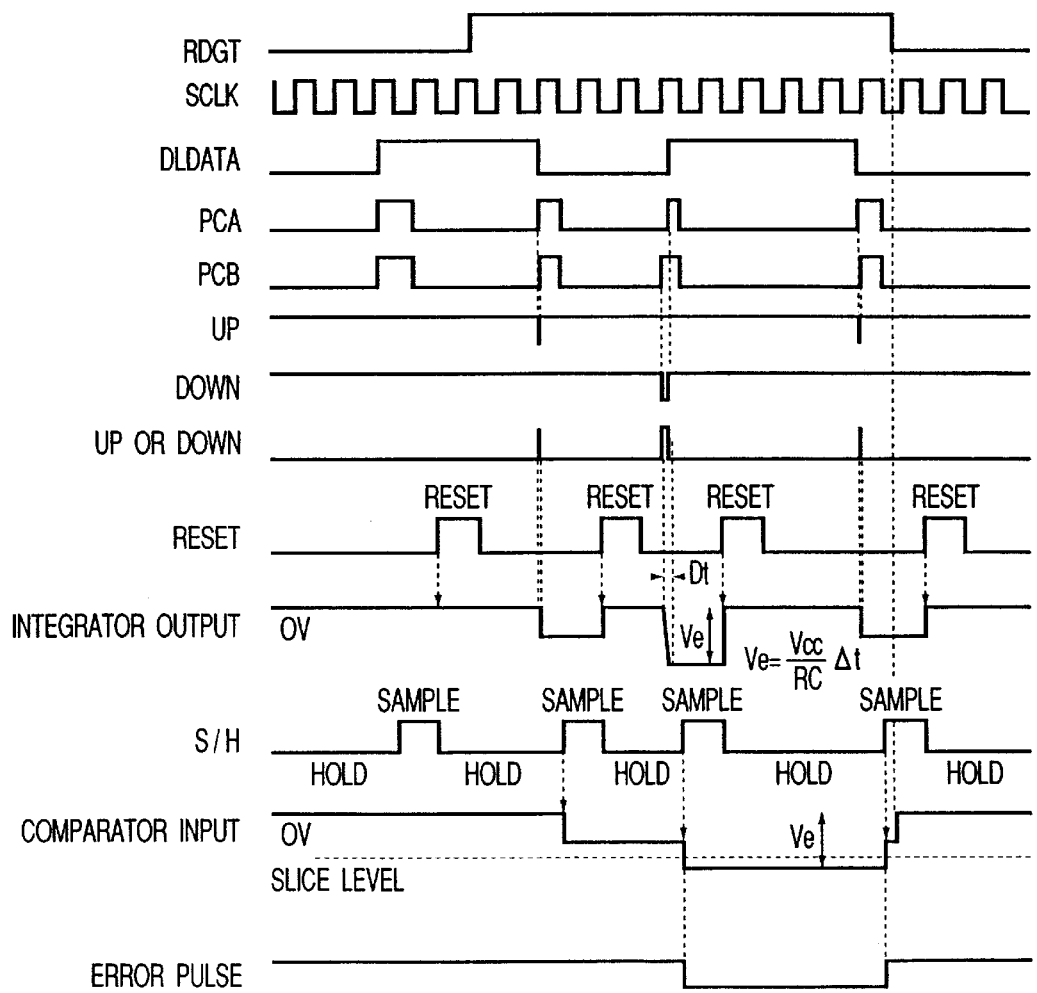
FIG. 9 is a timing chart showing circuit operations of the phase difference detector circuit in the embodiment of this invention.

The following describes circuit operations with reference to the timing chart shown in FIG. 9. Using the PLL clock signal and binary data signal (DLDATA), pulse signals PCA and PCB are generated for use in phase comparison. For generating PCA and PCB pulses, a gate array block having simple logic circuits is used (not shown in FIG. 8). Using the PCA and PCB pulses, two pulse signals UP and DOWN are generated through D-flip-flop and NAND gate circuits. A phase difference pulse signal can be attained by logical-ORing the UP and DOWN pulse signals, i.e., EXCLUSIVE-ORing the PCA and PCB signals. In the integrator, the phase difference pulse signal thus attained is subjected to integration for a period of 1.5 Tw. Upon completion of integration, the integrator is reset. At a time point of 0.5 Tw from the start of integration, the sampling and holding are performed to apply an input to the level comparator, thereby providing an error pulse signal. In this preferred embodiment of the present invention, two counters for error pulses and data edges are required in addition, which are not explained here since these counters are simple in structure, and/or can easily be implemented via standard counters currently available in the art.

Having described the phase difference detection method in which data edges having significant phase difference are converted into pulses for counting, it is also possible to determine a value of a phase difference by directly detecting phase difference voltages that can be attained through integration of the above mentioned phase difference pulse signals. In this case, since an integral value may fluctuate in time, it is preferable to provide a low-pass filter or other similar element additionally for suppressing fluctuation in time before detection by an AD converter, etc.

Figure 10:
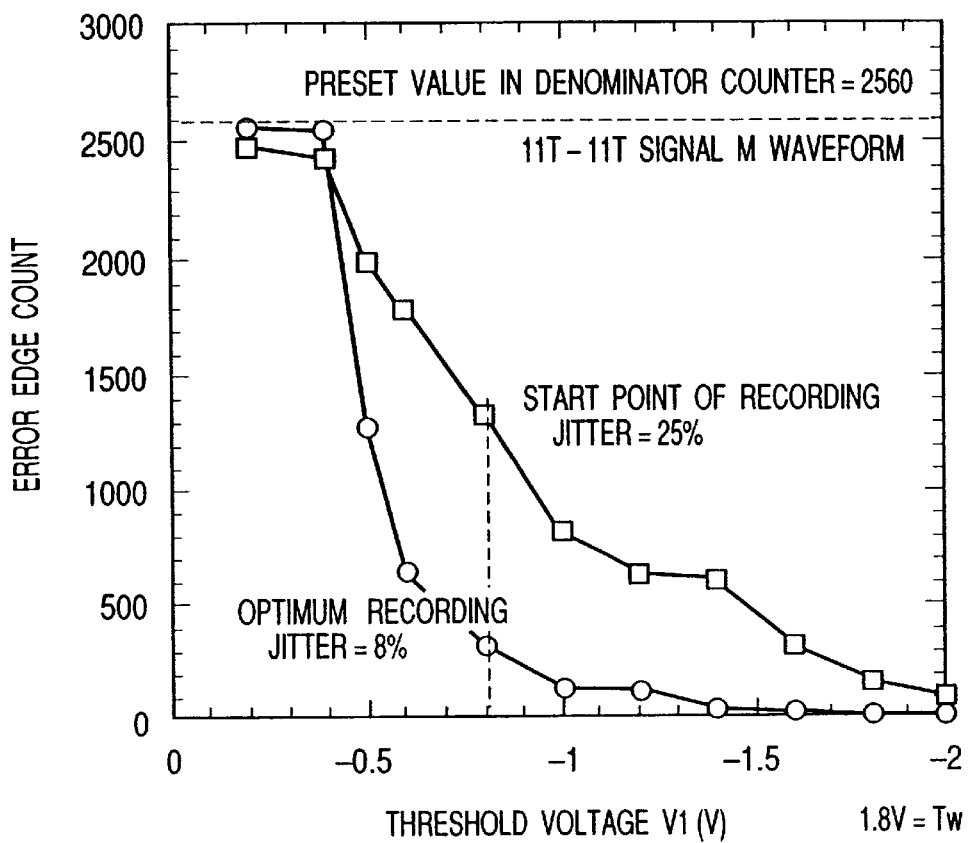
FIG. 10 is a graph showing a relationship between an error edge count and threshold of a level comparator.

Next, the following describes a relationship among an error edge count, a threshold in a level comparator and jitter. Referring to FIG. 10, there is shown a graph indicating a relationship between the error edge count and the threshold in a level comparator. Since the integrator was set to provide a sensitivity of 0.01 V/deg. in the experiment as mentioned before, a phase difference of ±Tw/2 corresponded to a threshold voltage value V1 of 1.8 V. Examination was made on cases of 25% jitter (equivalent to a maximum value) and 8% jitter (equivalent to a minimum value). Since the error edge count represents a count value of data edges having a phase difference of larger than the threshold voltage, the error edge count decreases as the threshold voltage increases. A difference in error edge count between 25% jitter and 8% jitter was maximized when the threshold voltage V1 was 0.8. Under this condition, variation in an error edge count is maximized with respect to variation in jitter, thereby making it possible to maximize the sensitivity in trial writing for detecting a threshold level.

Figure 11:
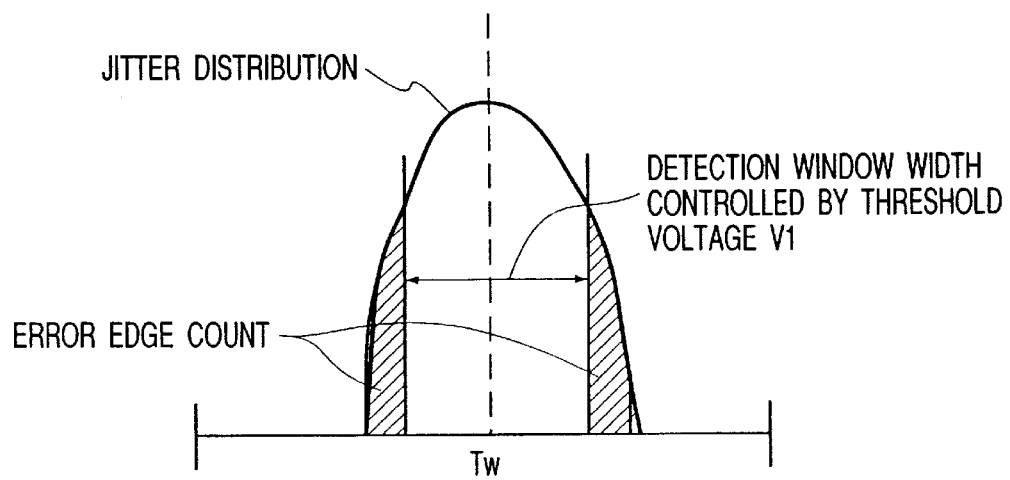
FIG. 11 is a schematic diagram showing a relationship among a jitter distribution, error edge count and threshold voltage.

Referring to FIG. 11, there is shown a schematic diagram indicating a relationship among jitter distribution, error edge count and threshold voltage. As indicated in this figure, the error edges to be counted correspond to the hatched areas where a phase difference of larger than the phase threshold voltage (larger than the threshold value) in jitter distribution takes place.

Figure 12:
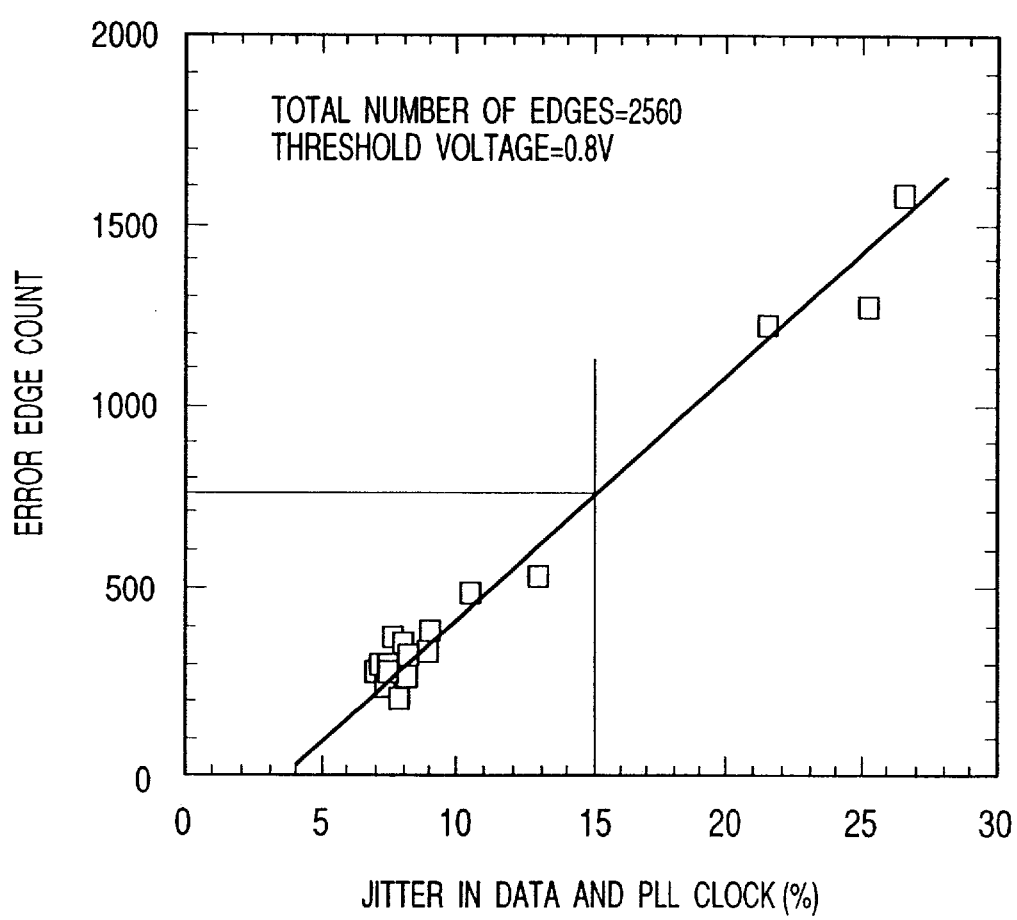
FIG. 12 is a graph showing a relationship between jitter and an error edge count.

Referring to FIG. 12, there is shown a graph indicating results of measurement on jitter and error edge count. As indicated in this graph, the error edge count increases linearly with an increase in jitter. It is therefore apparent that an equivalent value of jitter can be measured by detecting the number of error edges, thus confirming the validity of operations of the present invention. Of interest, when the jitter level is zero, the error edge count does not become zero because of dependency on offsetting and response speed of the phase difference detector circuit. Under a condition where the degree of phase difference is too small, the relevant circuit device becomes inactive so as not to produce UP and DOWN pulses. This characteristic varies depending on the discrete IC circuit configuration used for measurement. However, with respect to a jitter value of 15% to be detected, a detection range of 7% to 25% was confirmed in the experiment. In practice, therefore, no problem will occur as to trial writing. When an LSI circuit arrangement is made in carrying out the present invention, it is required to take into consideration a detection range and linearity. Also, when practicing the invention, consideration must be given to the threshold and the error edge count used as a target of detection so that the detection sensitivity will not become low. The relationship between power and error count shown in FIG. 1b can be provided by making arrangements as mentioned above. In the method of this invention, since the error count varies significantly with variation in the recording power in the vicinity of the recording threshold level, an error in recording power determination can be made small even if the threshold voltage V1 fluctuates effectively due to variation in temperature or power supply voltage.

Figure 13:
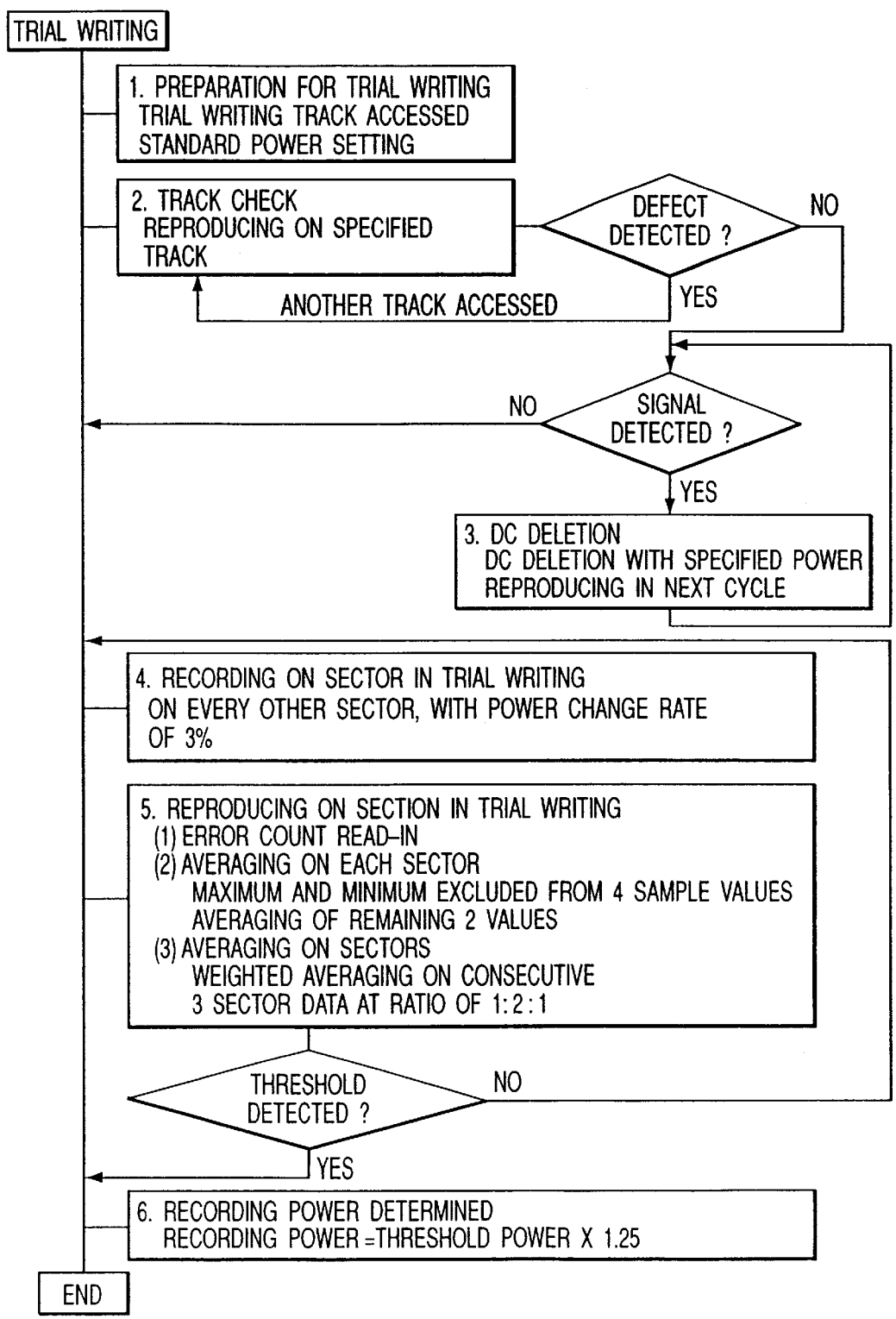
FIG. 13 is a flowchart showing trial writing sequence steps in a preferred embodiment of this invention, such steps being implementable by a programmed CPU.

Referring to FIG. 13, there is shown a flowchart indicating sequence steps of a trial writing of the present invention, such steps being implementable, for example, by a programmed CPU. At the first step of trial writing, a specified track is accessed and such conditions as recording power are set up for preparation. Then, a trial writing track is reproduced for a track check. If a rapid change in level is found in a reproduced signal, it is judged that there has occurred a defect due to, for example, dust, flaw, fluidization, etc. In this case, another track is accessed to perform the same processing, and switching of tracks is repeated until a non-defective track is found. Thereafter, a reproduced signal is used to check whether data has previously been recorded in such track. If recorded data is found, deletion (i.e., erasure) is performed using a DC beam so that there will be no data signal left recorded on the track. As a more specific method for detecting a defect and data signal, it can be utilized that a data signal mainly contains high-frequency components of 1 MHz or more and a defect mainly contains low-frequency components of 100 kHz or less. After filtering the reproduced signal for frequency band separation, a difference between upper and lower frequency envelopes attained though detection can be determined. This makes it possible to detect a signal distortion due to data amplitude or a defective condition. Then, for recording on the disc, the power level is changed for each sector. More particularly, a range of incremental power levels applied can correspond to a predetermined range (universally applied to all recording media), or can be variably set with respect to, for example, prior optimum power levels or entered/read data corresponding to a currently loaded media (e.g., manufacturer, media type, etc.).

In general, it is difficult to change the recording power condition instantaneously. Therefore, to accommodate a time required to conduct a change, alternate non-recorded sectors are used for power setting and actual recording is performed on every other sector. In common practice, power scanning is performed to provide a constant ratio of Pw to Pe. Since variation in sensitivity on discs and spot distortion due to aberration can be converted to equivalence in terms of power, power scanning at a constant ratio is suitable to compensate for variation in trial writing. In carrying out the present invention, only the recording power or reproducing power may be changed. As a rate of change in power, a range of 2% to 5% is proper in consideration of detection sensitivity and processing time parameters. Then, each recorded sector is reproduced to read the number of error edges.

To further alleviate an adverse effect due to possible occurrence of dust or any defect, one sector is divided into four regions and a number of error edges is counted within each region. In the results of counting on four regions, maximum and minimum values are excluded, and the remaining two resultant count values are used for averaging. In this fashion, even if there is a dust particle or defect on a sector, it can be excluded from the results of detection provided that the size thereof is less than ¼ of a sector. Also, to reduce an adverse effect due to circumferential-direction unevenness in recording sensitivity on a media, weighted averaging is performed on three consecutive measured values at a ratio of 1:2:1. Until the recording threshold condition is satisfied in detection of the number of error edges, recording and reproducing operations are repeated to determine a value of recording threshold power Pth. Then, a determined threshold power value is multiplied by a constant 'α' (approx. 1.25) to determine a value of an recording power Po for use in subsequent recording.

EXAMPLE 2

Information Recording-Reproducing Apparatus

Figure 14:
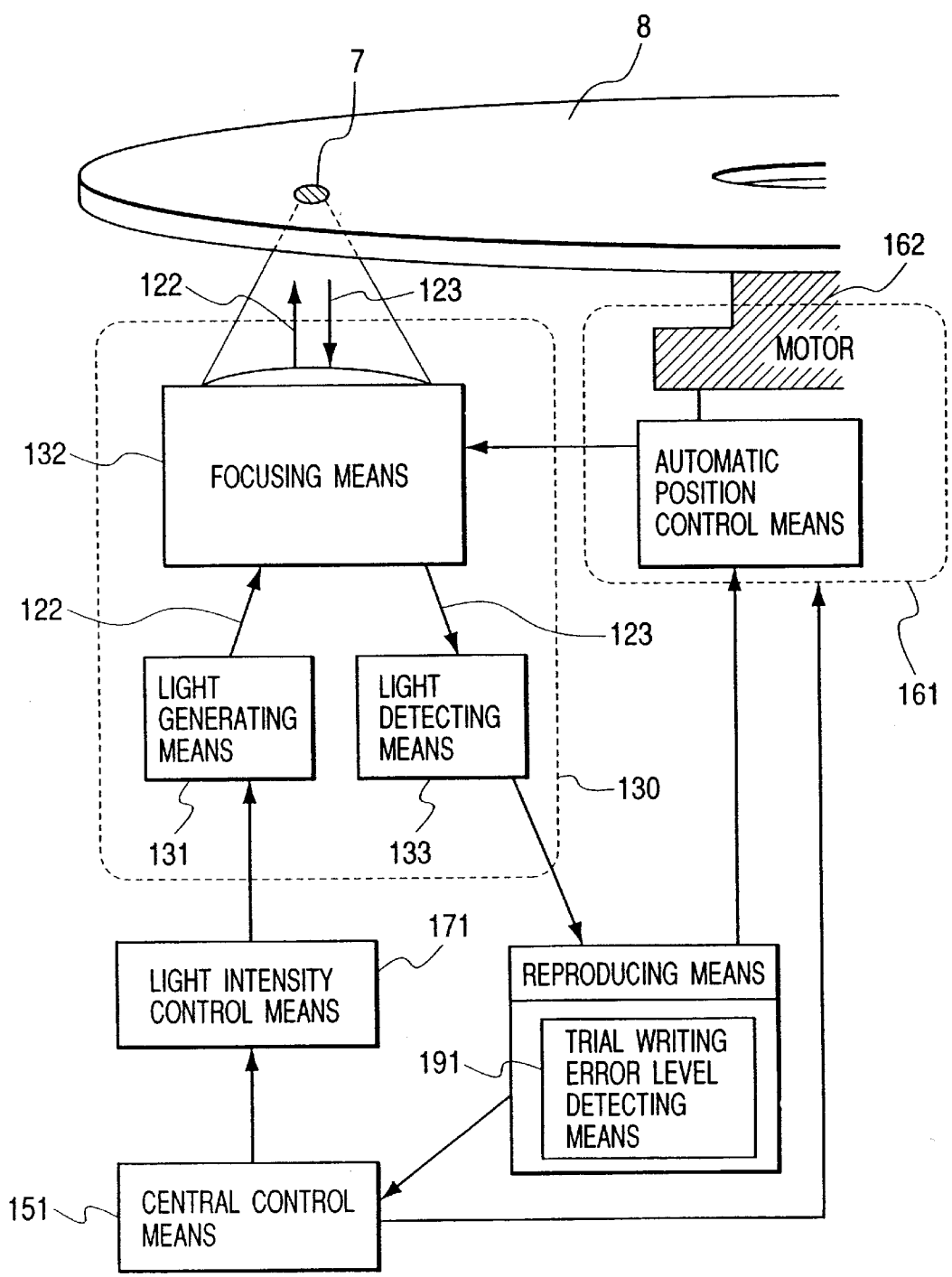
FIG. 14 is a diagram showing a structure of information recording-reproducing apparatus in a preferred embodiment of this invention.

FIG. 14 presents an example of an information recording-reproducing apparatus using the trial writing method and phase difference detection method in the preferred embodiment mentioned in Example 1. Referring to FIG. 14, an optical disc medium 8 is rotated by a motor 162. To provide an intensity level of light instructed by central control means 151, light intensity control means 171 controls light generating means 131 so as to suitably emit a light beam 122. Through focusing means 132, the light beam 122 is focused to form a light spot 7 on the optical disc medium 8. A light beam 123 reflected from the light spot 7 is detected by light detecting means 133. The light detecting means comprises a plurality of divided photodetector elements. Using a reproduced signal 130 from the light detecting means, reproducing means 191 reproduces information recorded on the optical disc medium. The reproducing means 191 contains detecting means for trial writing signals, which have been described in Example 1. For a trial writing operation, the central control means 151 provides a function for recording trial writing patterns while changing a recording power level as described in Example 1, a function for receiving a trial writing signal detected by the trial writing signal detecting means, and a function for processing the results of input and determining an optimum power level. At least the FIG. 14 central control means 151 can be provided via a suitably programmed microprocessor, which performs, among other operations, the operations described and illustrated with respect to the present invention.

In summary, the information recording-reproducing apparatus of this invention can determine an optimum level of recording power through compensation for difference in sensitivity on media and variation in light spot, thereby making it possible to record and reproduce high-density information with advantageous stability.

While the invention has been described in its preferred embodiment wherein the recording power is optimized by determining a low power condition that jitter is less than the threshold and multiplying a determined power value by the constant, it is to be understood that a similar arrangement of apparatus makes it possible easily to realize the following; (1) determining a power condition where an error count (jitter) is minimized, and (2) determining low and high power conditions where jitter is less than the threshold, and then determining a power condition corresponding to an approximate average value of these conditions.

Figure 15:
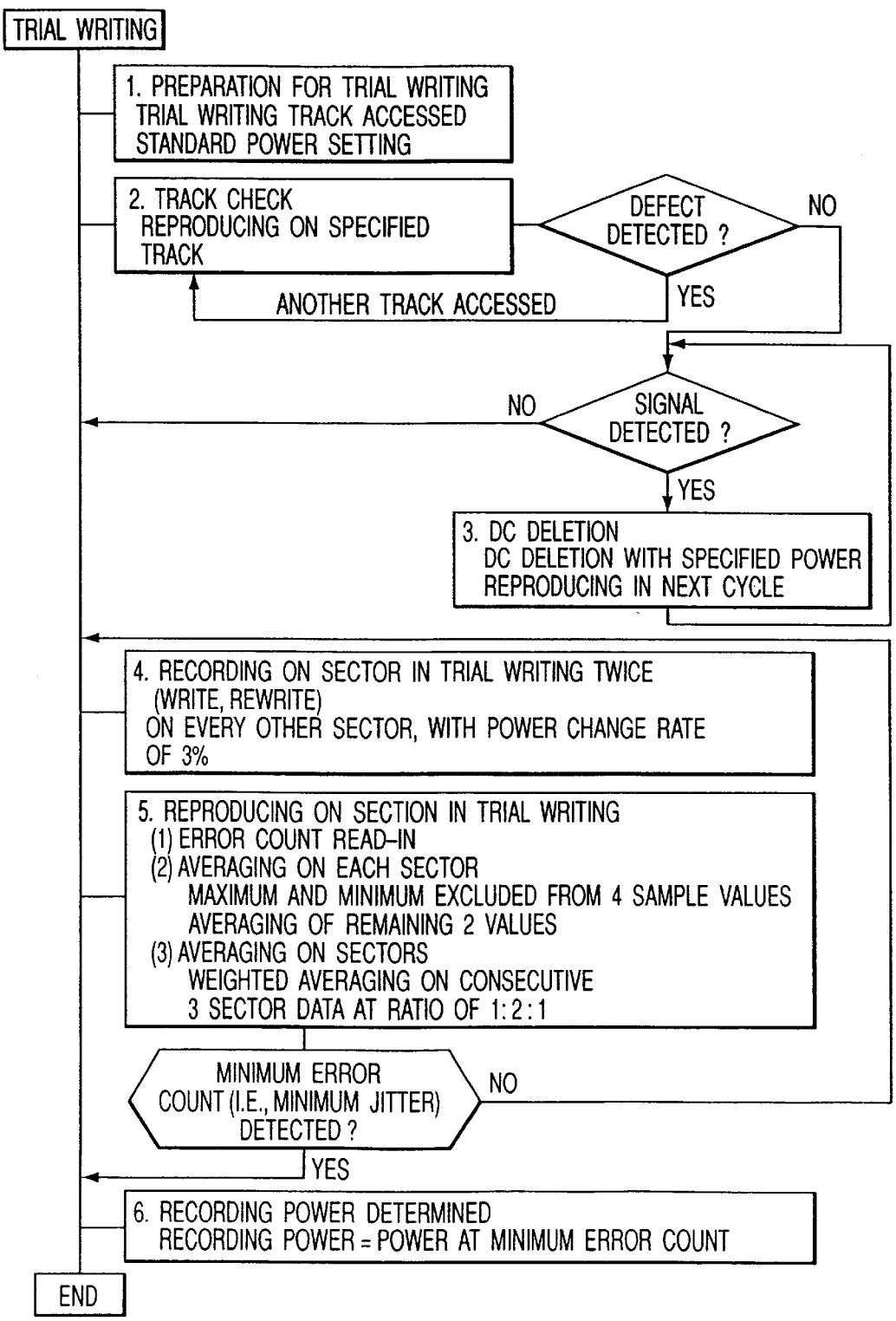
FIG. 15 is a flowchart showing trial writing sequence steps in another preferred embodiment of this invention, such steps being implementable by a programmed CPU.
Figure 16:
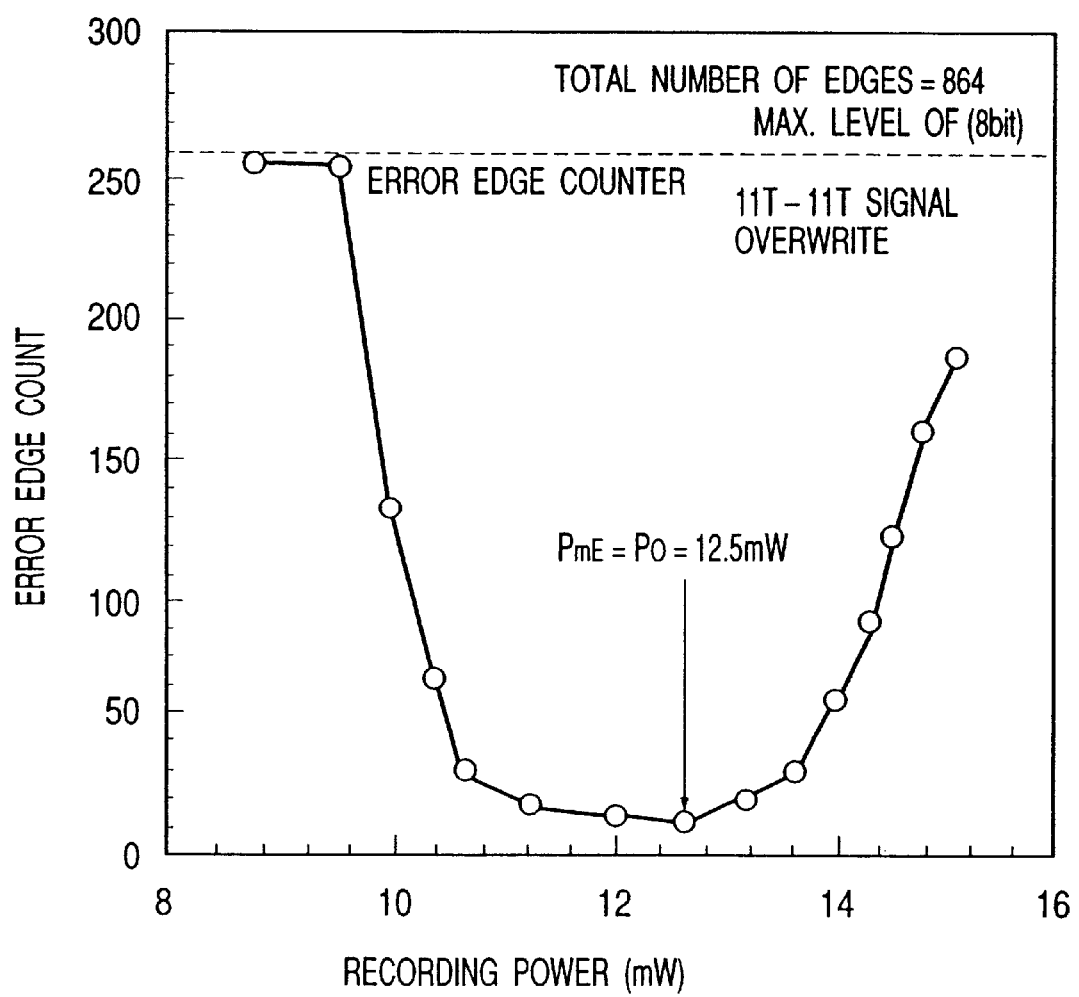
FIG. 16 is a graph showing a relationship between an error edge count and a recording power, and determination of an optimum recording power at a point of lowest error count.

More particularly, FIGS. 15 and 16 are exemplary of the approach of determining an optimum power condition at a point where an error count (jitter) is minimized. As to differences of FIG. 15's flowchart from FIG. 13's, in a step 4, trial writing is at least twice performed, i.e., is written once and is then rewritten at least once more as it has been found that a first writing of a media may give an unsettled error count plot, whereas second and subsequent writings give error count plots which more closely resemble an ultimate (i.e., multiple-writing stabilized) error count plot. As a further difference, after a step 5, rather than detecting a threshold power Pth, a minimum error power Pme (12.5 mW; FIG. 16) is detected. Finally, in a step 6, rather than multiply by the factor α, the minimum error power Pme is simply taken (without adjustment) as the optimum power Po.

Figure 17:
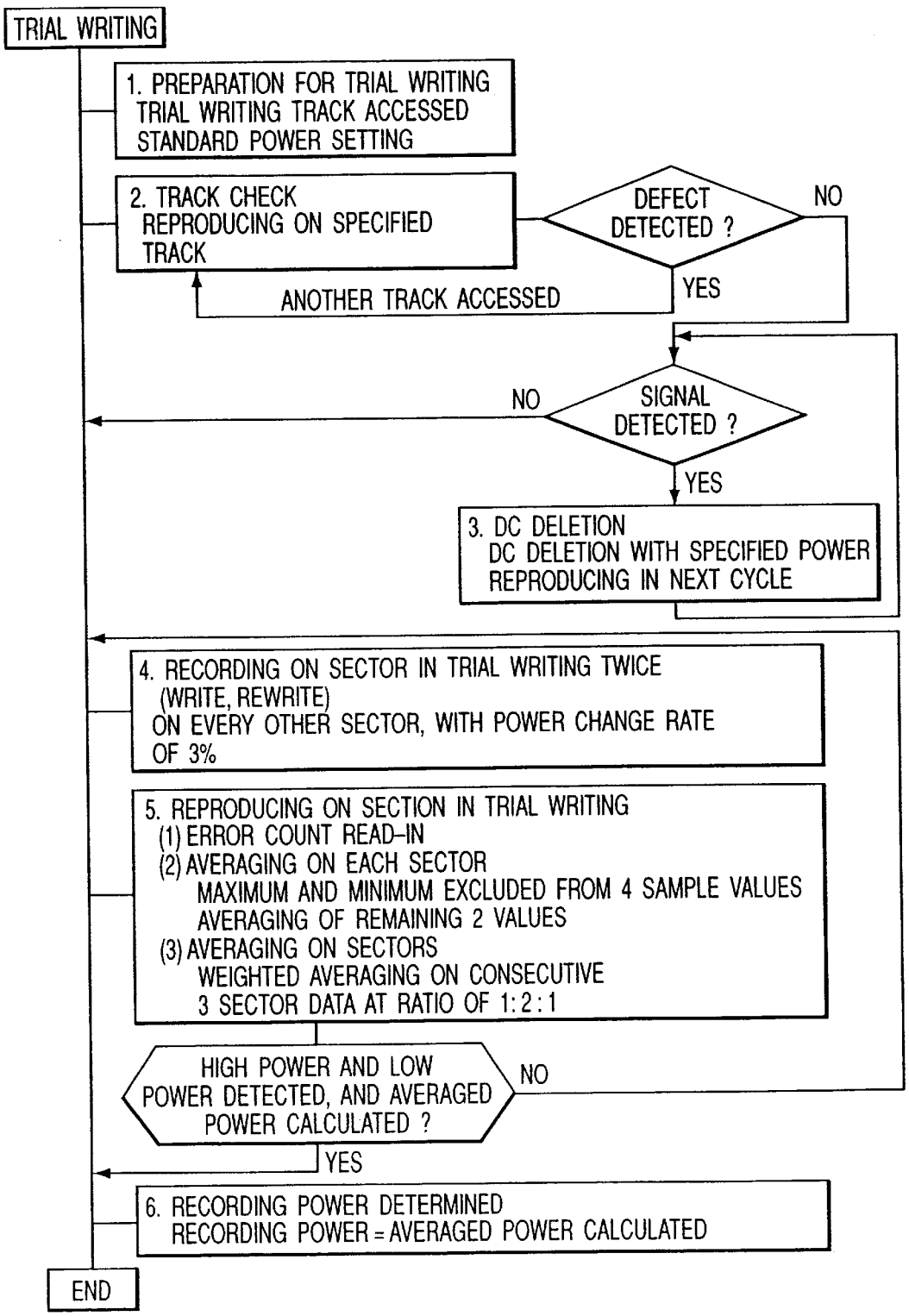
FIG. 17 is a flowchart showing trial writing sequence steps in yet another embodiment of this invention, such steps being implementable by a programmed CPU.
Figure 18:
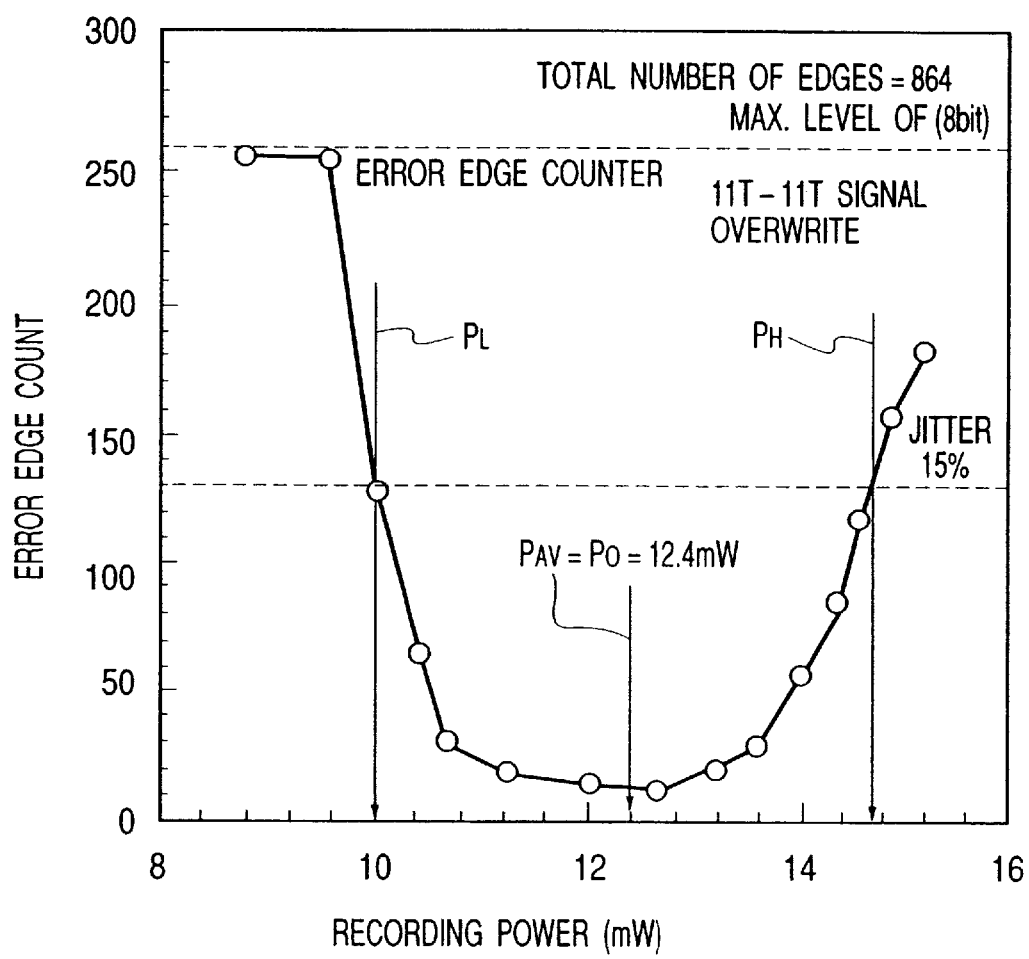
FIG. 18 is a graph showing a relationship between an error edge count and a recording power, and determination of an averaged power level as an optimum power level.

FIGS. 17 and 18 are exemplary of the approach of determining an optimum power condition as an averaged power level existing between low and high power conditions. As to differences of FIG. 17's flowchart from FIG. 15's, after step 5, rather than detecting a point of a minimum error count, a low power P1 (10 mW; FIG. 18) and a high power Ph (14.8 mW; FIG. 18) of a 15% or less jitter range are detected, and an averaged power is detected (14.8+10) ÷(2)=12.4 mW). In a step 6, the averaged power is simply taken as the optimum power Po.

Although the FIG. 13 "threshold power", FIG. 15 "minimum error count", and FIG. 17 "averaged power" embodiments can result in slightly differing optimum power levels using the same trial writing disc or data (e.g., FIG. 15/16 minimum error count analysis resulted in a 12.5 mW power level, whereas FIG. 17/18 averaged power analysis resulted in a 12.4 mW power level), all such determined power levels are within an acceptable range. In practice, the FIG. 13 threshold power embodiment is preferred over the minimum error and averaged power embodiments in determination of the optimum power.

The present invention is intended to provide novel means for optimizing a power condition through detection of conditions of reproduced signals as phase difference values, and it is therefore obvious that the invention is applicable to magneto-optical discs, pit-forming-type write-once optical discs, magnetic discs, etc., as well as phase-change optical discs. In carrying out the invention in application to magnetic discs or certain types of magneto-optical discs, a phase difference value may be detected while changing a magnetic field intensity that is applied to a medium since a control variable of recording condition corresponding to the above mentioned laser power takes a value of the magnetic field intensity.

As mentioned above, it was found that a ratio of recording threshold power to center value of power margin is approximately constant on sample optical discs having different layer compositions. Also, it was revealed that the detection sensitivity varies in the vicinity of threshold power level depending on recording patterns and the single-pattern repetitive signals provide higher sensitivity and less variation than the random data signals. Through examination of these characteristics on optical disc apparatus, the phase detection method was devised, in which the number of data edges corresponding to significant phase errors is counted. Then, it was demonstrated through experiment that the trial writing by the devised phase difference detection method can be carried out on optical disk media. By enabling trial writing suitable for phase-change optical disc characteristics, this invention can provide a reliable method/apparatus for quickly, easily and accurately determining an optimum recording condition, thereby making it possible to realize stable high-density information recording and reproducing operations.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts, arrangements and/or uses of the subject combination arrangement within the scope of the foregoing disclosure, the drawings and the appended claims without departing from the spirit of the invention.

What is claimed is:

1. A data recording apparatus comprising:
   a means for recording trial marks on an information storage medium by changing a recording condition in a predetermined area;
   a means for reading said trial marks to obtain a reproduced signal;
   a means for generating a reference clock signal from said reproduced signal;
   a means for generating phase difference voltages according to phase differences between said reproduced signal and said reference clock signal;
   a means for generating phase error pulses when said phase difference voltages are larger or smaller than a predetermined voltage;
   a means for counting said phase error pulses in said predetermined area;
   a means for detecting a threshold recording condition in terms of counts of phase error pulses; and
   a means for setting an optimum recording condition using said threshold recording condition and a predetermined margin value.

2. A data recording apparatus as claimed in claim 1, wherein said apparatus uses recorded/reproduced said trial marks of only a substantially same channel bit length to determine said optimum recording condition.

3. An apparatus as claimed in claim 2, wherein said information storage medium is more specifically an optical data recording medium, and said apparatus more specifically determines a writing laser beam power level to be used for subsequent mark writing.

4. An apparatus as claimed in claim 2, wherein said trial marks are more specifically of only a substantially 11T channel bit length (where T is a predetermined length).

5. An apparatus as claimed in claim 2, wherein said information storage medium is more specifically an optical data recording medium, and said trial marks are more specifically provided in a plurality of trial mark groups, with said groups respectively being recorded at mutually different predetermined writing laser beam power levels, and wherein said apparatus more specifically uses said groups to determine said optimum recording condition.

6. An apparatus as claimed in claim 5, wherein said apparatus more specifically determines and uses data concerning phase difference levels encountered within said groups to determine said optimum recording condition.

7. An apparatus as claimed in claim 6, wherein said means more specifically performs averaging of lowest and highest said writing laser beam power levels to determine an averaged power level as an optimum writing laser beam power level.

8. A data recording apparatus as claimed in claim 1, wherein:
   said information storage medium is an optical information recording disc;
   said trial marks are recorded on said optical information recording disc in predetermined groups;
   said recording condition is laser beam power levels;
   said threshold recording condition is a threshold power level Pth related to a predetermined percentage of said phase error pulses detected: and
   said optimum recording condition Popt is determined by Popt=α×Pth, where α is a predetermined constant.

9. A data recording apparatus as claimed in claim 8, wherein:
   said trial marks are constituted of mark and space series signals of approximately a same bit length.

10. A data recording apparatus as claimed in claim 1, wherein:
    said trial marks are constituted of mark and space series signals of approximately a same bit length.

11. A data recording apparatus determining a writing condition for a loaded data recording medium as a result of recording/reproducing trial marks, comprising:
    a determination apparatus using recorded/reproduced trial marks of only a substantially same channel bit length to determine said writing condition,
    wherein said data recording medium is more specifically an optical data recording medium, and said trial marks are more specifically provided in a plurality of trial mark groups, with said groups respectively being recorded at mutually different predetermined writing laser beam power levels, and wherein said determination apparatus more specifically uses said groups to determine said writing condition,
    wherein said determination apparatus more specifically determines and uses data concerning phase difference levels encountered within said groups to determine said writing condition, and
    wherein said determination means more specifically uses said data concerning phase difference levels to determine a threshold writing laser beam power corresponding to a lowest said writing laser beam power level where a predetermined percentage of said trial marks at said writing laser beam power level incur at least a predetermined phase difference from a clock pulse derived from said trial marks, and said determination means then determines an optimum writing laser beam power level for subsequent mark writing by adjusting said threshold writing laser beam power by a predetermined factor.

12. A data recording apparatus determining a writing condition for a loaded data recording medium as a result of recording/reproducing trial marks comprising:
    a determination apparatus using recorded/reproduced trial marks periodically written using only a substantially same pit recording waveform to determine said writing condition,
    wherein said data recording medium is more specifically an optical data recording medium, and said trial marks are more specifically provided in a plurality of trial mark groups, with said groups respectively being recorded at mutually different predetermined writing laser beam power levels, and wherein said determination apparatus more specifically uses said groups to determine said writing condition, wherein said determination apparatus more specifically determines and uses data concerning phase difference levels encountered within said groups to determine said writing condition, and wherein said determination means more specifically uses said data concerning phase difference levels to determine a threshold writing laser beam power corresponding to a lowest said writing laser beam power level where a predetermined percentage of said trial marks at said writing laser beam power level incur at least a predetermined phase difference from a clock pulse derived from said trial marks, and said determination means then determines an optimum writing laser beam power level for subsequent mark writing by adjusting said threshold writing laser beam power by a predetermined factor.

13. A data reproducing apparatus determining a writing condition for a loaded data recording medium as a result of recording/reproducing trial marks, comprising:

a determination apparatus using phase differences between recorded/reproduced trial marks and clock pulses derived from said trial marks, to determine said writing condition, wherein said data recording medium is more specifically an optical data recording medium, and said trial marks are more specifically provided in a plurality of trial mark groups, with said groups respectively being recorded at mutually different predetermined writing laser beam power levels, and wherein said determination apparatus more specifically uses said groups to determine said writing condition, wherein said determination apparatus more specifically determines and uses data concerning phase difference levels encountered within said groups to determine said writing condition, and wherein said determination means more specifically uses said data concerning phase difference levels to determine a threshold writing laser beam power corresponding to a lowest said writing laser beam power level where a predetermined percentage of said trial marks at said writing laser beam power level incur at least a predetermined phase difference from a clock pulse derived from said trial marks, and said determination means then determines an optimum writing laser beam power level for subsequent mark writing by adjusting said threshold writing laser beam power by a predetermined factor.

14. A data recording method determining a writing condition for an information storage medium as a result of recording/reproducing trial marks, said method comprising the step of:

recording trial marks on said information storage medium by changing a recording condition in a predetermined area;

reading said trial marks to obtain a reproduced signal;

generating a reference clock signal from said reproduced signal;

generating phase difference voltages according to phase differences between said reproduced signal and said reference clock signal;

generating phase error pulses when said phase difference voltages are larger or smaller than a predetermined voltage;

counting said phase error pulses in said predetermined area;

detecting a threshold recording condition in terms of counts of phase error pulses; and setting an optimum recording condition using said threshold recording condition and a predetermined margin value.

15. A method as claimed in claim 14, wherein:

said information storage medium is an optical information recording disc;

said trial marks are recorded on said information storage medium in predetermined groups;

said recording condition is laser beam power levels;

said threshold recording condition is a threshold power level Pth related to a predetermined percentage of said phase error pulses detected; and said optimum recording condition Popt is determined by Popt=α×Pth, where α is a predetermined constant.

16. A method as claimed in claim 15, wherein:

said trial marks are constituted of mark and space series signals of approximately a same bit length.

17. A method as claimed in claim 14, wherein said trial marks are more specifically of only a substantially 11T channel bit length (where T is a predetermined length).

18. A method as claimed in claim 14, wherein said information storage medium is more specifically an optical data recording medium, and said trial marks are more specifically provided in a plurality of trial mark groups, with said groups respectively being recorded at mutually different predetermined writing laser beam power levels, and wherein said method more specifically uses said groups to determine said optimum recording condition.

19. A method as claimed in claim 18, wherein said method more specifically determines and uses data concerning phase difference levels encountered within said groups to determine said writing condition.

20. A method as claimed in claim 14, wherein:

said trial marks are constituted of mark and space series signals of approximately a same bit length.

21. A data recording/reproducing method determining a writing condition for a loaded data recording medium as a result of recording/reproducing trial marks, said method comprising the steps of:

using recorded/reproduced trial marks of only a substantially same channel bit length to determine said writing condition, wherein said data recording medium is more specifically an optical data recording medium, and said trial marks are more specifically provided in a plurality of trial mark groups, with said groups respectively being recorded at mutually different predetermined writing laser beam power levels, and wherein said using step more specifically uses said groups to determine said writing condition, wherein said using step more specifically determines and uses data concerning phase difference levels encountered within said groups to determine said writing condition, and wherein said using step more specifically uses said data concerning phase difference levels to determine a threshold writing laser beam power corresponding to a lowest said writing laser beam power level where a predetermined percentage of said trial marks at said writing laser beam power level incur at least a predetermined phase difference from a clock pulse derived from said trial marks, and then determines an optimum writing laser beam power level for subsequent marks writing by adjusting said threshold writing laser beam power by a predetermined factor.

22. A data recording method determining a writing condition for a loaded data recording medium as a result of recording/reproducing trial marks, said method comprising the steps of:

using recorded/reproduced trial marks periodically written using only a substantially same pit recording waveform to determine said writing condition.

wherein said data recording medium is more specifically an optical data recording medium, and said trial marks are more specifically provided in a plurality of trial mark groups, with said groups respectively being recorded at mutually different predetermined writing laser beam power levels, and wherein said using step more specifically uses said groups to determine said writing condition, wherein said using step more specifically determines and uses data concerning phase difference levels encountered within said groups to determine said writing condition, and wherein said using step more specifically uses said data concerning phase difference levels to determine a threshold writing laser beam power corresponding to a lowest said writing laser beam power level where a predetermined percentage of said trial marks at said writing laser beam power level incur at least a predetermined phase difference from a clock pulse derived from said trial marks, and then determines an optimum writing laser beam power level for subsequent mark writing by adjusting said threshold writing laser beam power by a predetermined factor.

23. A data reproducing method determining a writing condition for a loaded data recording medium as a result of recording/reproducing trial marks, said method comprising the steps of:

using phase differences between recorded/reproduced trial marks and clock pulses derived from said trial marks, to determine said writing condition, wherein said data recording medium is more specifically an optical data recording medium, and said trial marks are more specifically provided in a plurality of trial mark groups, with said groups respectively being recorded at mutually different predetermined writing laser beam power levels, and wherein said using step more specifically uses said groups to determine said writing condition, wherein said using step more specifically determines and uses data concerning phase difference levels encountered within said groups to determine said writing condition, and wherein said using step more specifically uses said data concerning phase difference levels to determine a threshold writing laser beam power corresponding to a lowest said writing laser beam power level where a predetermined percentage of said trial marks at said writing laser beam power level incur at least a predetermined phase difference from a clock pulse derived from said trial marks, and then determines an optimum writing laser beam power level for subsequent mark writing by adjusting said threshold writing laser beam power by a predetermined factor.

24. A signal recording method comprising:

recording data on an information storage medium;

reading data recorded on said information storage medium to obtain a reproduced signal;

detecting phase differences between said reproduced signal and a reference signal; and determining a condition for subsequently recording data on said information storage medium according to said phase differences;

wherein said recording, reading, detecting and determining steps are performed in the stated order, wherein:

said information storage medium is an optical information recording disc;

said reference signal is a clock signal generated from said reproduced signal;

said data is recorded on said optical information recording disc in predetermined groups, with respective said groups being recorded with mutually differing laser beam power levels;

said phase differences are detected with respect to each of said groups, and said phase differences are used to determine a threshold recording power where a predetermined percentage of said phase differences occurs; and said condition is an optimum recording power determined by multiplying said threshold recording power by a predetermined constant.

* * * * *